United States Patent
Wozniak et al.

(10) Patent No.: US 10,909,403 B2
(45) Date of Patent: Feb. 2, 2021

(54) VIDEO FRAME BRIGHTNESS FILTER

(71) Applicant: Microsoft Technology Licensing, LLC, Redmond, WA (US)

(72) Inventors: Matthew Richard Wozniak, Bellevue, WA (US); Mehmet Kucukgoz, Seattle, WA (US); Holly Helene Pollock, Woodinville, WA (US); Ian Glen Neal, Ann Arbor, MI (US); Rafael Vincent Prieto Vertido, Renton, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 69 days.

(21) Appl. No.: 16/210,380

(22) Filed: Dec. 5, 2018

(65) Prior Publication Data
US 2020/0184247 A1    Jun. 11, 2020

(51) Int. Cl.
| | | |
|---|---|---|
| *G06K 9/32* | (2006.01) | |
| *G06T 7/11* | (2017.01) | |
| *G02B 5/20* | (2006.01) | |
| *H04N 5/232* | (2006.01) | |
| *H04N 5/235* | (2006.01) | |

(52) U.S. Cl.
CPC ............ *G06K 9/3233* (2013.01); *G02B 5/20* (2013.01); *G06T 7/11* (2017.01); *H04N 5/235* (2013.01); *H04N 5/23229* (2013.01)

(58) Field of Classification Search
CPC ................................ G06T 7/246; G06T 5/006
USPC ....... 382/167, 190, 131, 128, 103, 100, 154; 348/242, 241, 345
See application file for complete search history.

(56) References Cited

U.S. PATENT DOCUMENTS

| | | |
|---|---|---|
| 7,744,216 B1 | 6/2010 | Uhlhorn |
| 8,605,017 B2 | 12/2013 | Brown Elliott et al. |
| 9,479,695 B2 | 10/2016 | Lim et al. |
| 9,900,967 B2 | 2/2018 | Isaacs et al. |
| (Continued) | | |

FOREIGN PATENT DOCUMENTS

| | | |
|---|---|---|
| EP | 3035681 A1 | 6/2016 |
| WO | 2018042721 A1 | 3/2018 |

OTHER PUBLICATIONS

"Non Final Office Action Issued in U.S. Appl. No. 16/210,578", dated May 2, 2019, 16 Pages.
(Continued)

*Primary Examiner* — Kiet M Doan
(74) *Attorney, Agent, or Firm* — Alleman Hall Creasman & Tuttle LLP

(57) ABSTRACT

A computing device is provided, including a display and a processor. The processor may, for each frame of a plurality of frames included in a video, determine a brightness characterization for a region of interest of the frame. The processor may determine one or more additional brightness characterizations for the region of interest of one or more additional frames of the plurality of frames. The processor may determine that a high brightness condition is present in the region of interest. The processor may generate a filter for the frame based on the brightness characterization and the one or more additional brightness characterizations. The processor may apply the filter to the region of interest of the frame to generate a filtered frame. The high brightness condition is not present in the region of interest of the filtered frame. The processor may output the filtered frame for display at the display.

22 Claims, 6 Drawing Sheets

(56) References Cited

U.S. PATENT DOCUMENTS

| | | |
|---|---|---|
| 10,168,879 B1 | 1/2019 | Duan et al. |
| 2004/0017944 A1 | 1/2004 | Ding et al. |
| 2006/0268180 A1 | 11/2006 | Chou |
| 2007/0132865 A1 | 6/2007 | Adams et al. |
| 2008/0122813 A1 | 5/2008 | Kim et al. |
| 2009/0174638 A1 | 7/2009 | Brown Elliott et al. |
| 2009/0324074 A1 | 12/2009 | Dembo |
| 2010/0085361 A1 | 4/2010 | Kim et al. |
| 2011/0109743 A1 | 5/2011 | Kuehnle et al. |
| 2012/0114264 A1 | 5/2012 | Shmunk et al. |
| 2012/0182333 A1 | 7/2012 | Baba et al. |
| 2013/0076874 A1 | 3/2013 | Mentz et al. |
| 2013/0093802 A1 | 4/2013 | Tanaka |
| 2013/0129214 A1 | 5/2013 | Toda |
| 2013/0187958 A1 | 7/2013 | Kimpe et al. |
| 2013/0286245 A1 | 10/2013 | Samadani |
| 2013/0336445 A1 | 12/2013 | Sehnert et al. |
| 2016/0110846 A1 | 4/2016 | Park et al. |
| 2016/0148414 A1 | 5/2016 | Itani et al. |
| 2016/0234455 A1 | 8/2016 | Thompson et al. |
| 2017/0039967 A1* | 2/2017 | Jung .................. G06T 5/40 |
| 2017/0200296 A1 | 7/2017 | Jones et al. |
| 2017/0365101 A1 | 12/2017 | Samec et al. |
| 2018/0160993 A9* | 6/2018 | Lee .................. G06K 9/6202 |
| 2018/0288383 A1 | 10/2018 | Kring |
| 2020/0082791 A1 | 3/2020 | Petrie |
| 2020/0186744 A1 | 6/2020 | Wozniak et al. |
| 2020/0186764 A1 | 6/2020 | Wozniak et al. |

OTHER PUBLICATIONS

"Final Office Action Issued in U.S. Appl. No. 16/210,578", dated Sep. 18, 2019, 17 Pages.

"Non Final Office Action Issued in U.S. Appl. No. 16/210,667", dated Sep. 26, 2019, 19 Pages.

"International Search Report and Written Opinion issued in PCT Application No. PCT/US19/063133", dated Mar. 17, 2020, 14 Pages.

"International Search Report and Written Opinion issued in PCT Application No. PCT/US19/063134", dated Mar. 16, 2020, 13 Pages.

"International Search Report and Written Opinion issued in PCT Application No. PCT/US19/063481", dated Mar. 23, 2020, 16 Pages.

"Non Final Office Action Issued in U.S. Appl. No. 16/210,667", dated Jun. 22, 2020, 19 Pages.

"Non Final Office Action Issued in U.S. Appl. No. 16/210,578", dated Feb. 6, 2020, 21 Pages.

"Final Office Action Issued in U.S. Appl. No. 16/210,667", dated Mar. 9, 2020, 20 Pages.

"Final Office Action Issued in U.S. Appl. No. 16/210,667", dated Dec. 2, 2020, 27 Pages, \* cited by examiner

VIDEO FRAME BRIGHTNESS FILTER

BACKGROUND

Some users of display devices have eyes that are sensitive to bright light and/or to sudden increases in brightness. When such users watch videos, the users' vision systems may be irritated by some portions of the videos. Past solutions to this problem have included darkening the entire video. However, darkening the entire video may make it difficult to notice detail in dark frames of the video. This problem is particularly apparent when the video is watched both by a user whose eyes are sensitive and by a user whose eyes are not sensitive. A video that is dark enough for a user whose eyes are sensitive may be too dark for a user whose eyes are not sensitive.

SUMMARY

According to one aspect of the present disclosure, a computing device is provided, including a display and a processor. The processor may be configured to, for each frame of a plurality of frames included in a video, determine a brightness characterization for at least a region of interest of the frame. The processor may be further configured to determine one or more additional brightness characterizations for at least the region of interest of one or more additional frames of the plurality of frames. The processor may be further configured to determine that a high brightness condition is present in the region of interest. The processor may be further configured to generate a filter for the frame based on the brightness characterization and the one or more additional brightness characterizations. The processor may be further configured to apply the filter to at least the region of interest of the frame to generate a filtered frame. The high brightness condition is not present in the region of interest of the filtered frame. The processor may be further configured to output the filtered frame for display at the display.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
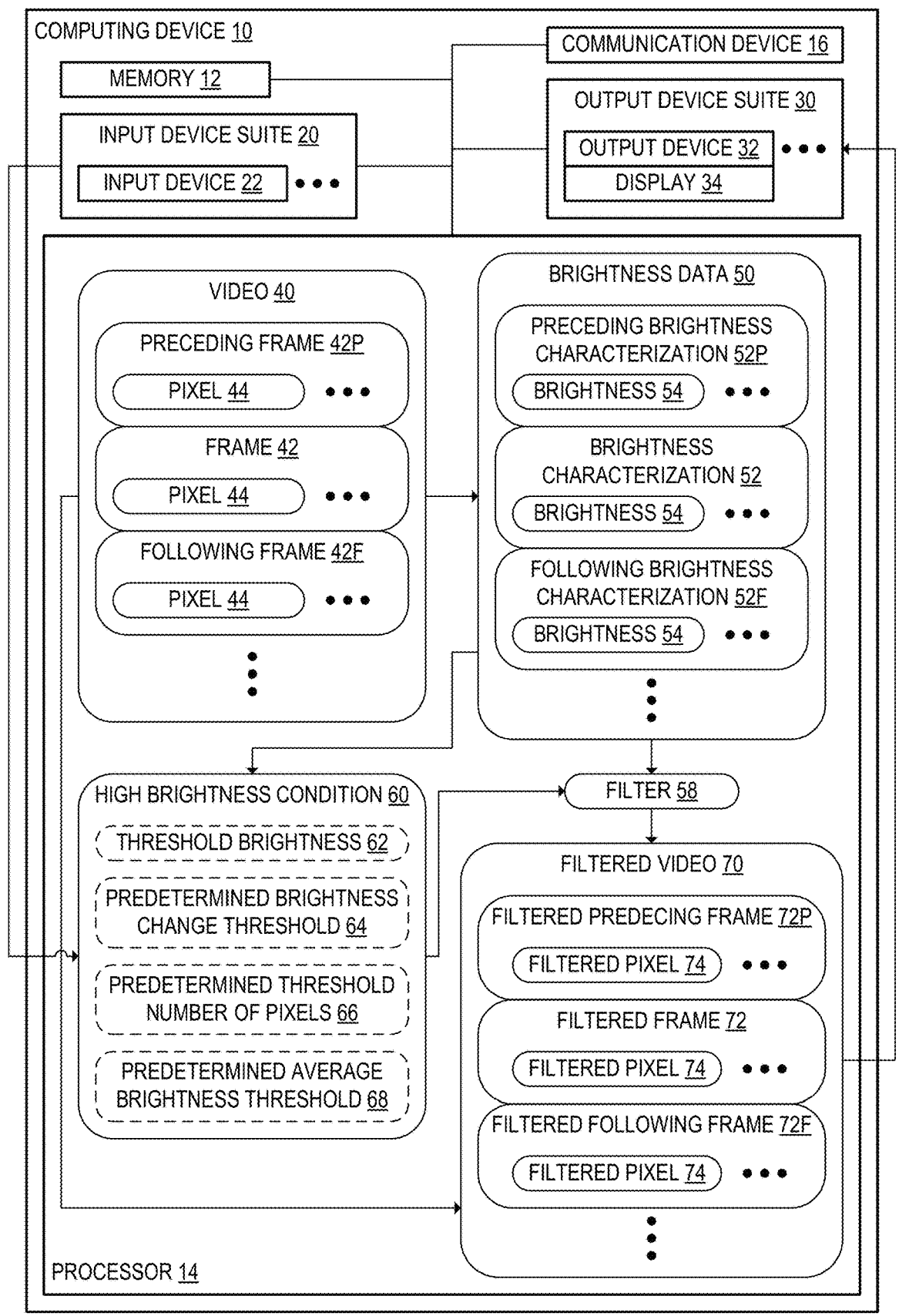
FIG. 1 shows a computing device according to one example embodiment.

In order to address the problems discussed above, the inventors have conceived of the following systems and methods. FIG. 1 shows a computing device 10 according to one embodiment of the present disclosure. The computing device 10 may include memory 12 and a processor 14 operatively coupled to the memory 12. The computing device 10 may further include an input device suite 20 including one or more input devices 22, which may be operatively coupled to the processor 14 and/or the memory 12. For example, the one or more input devices 22 may include one or more of a touchscreen, a trackpad, a keyboard, a mouse, one or more buttons, a microphone, one or more position sensors, and/or one or more other input devices 22. The computing device 10 may further include an output device suite 30 including one or more output devices 32. The output device suite 30 may include a display 34. Other output devices 32, such as one or more speakers and/or haptic feedback devices, may also be included in the output device suite 30. The computing device 10 may further include one or more communication devices 16 via which the computing device 10 may communicate with one or more other computing devices. In some embodiments, one or more functions of at least one of the memory 12, processor 14, one or more input devices 22, and/or one or more output devices 32 may be equipped on the one or more other computing devices in addition or alternatively to being equipped on computing device 10.

Figure 2:
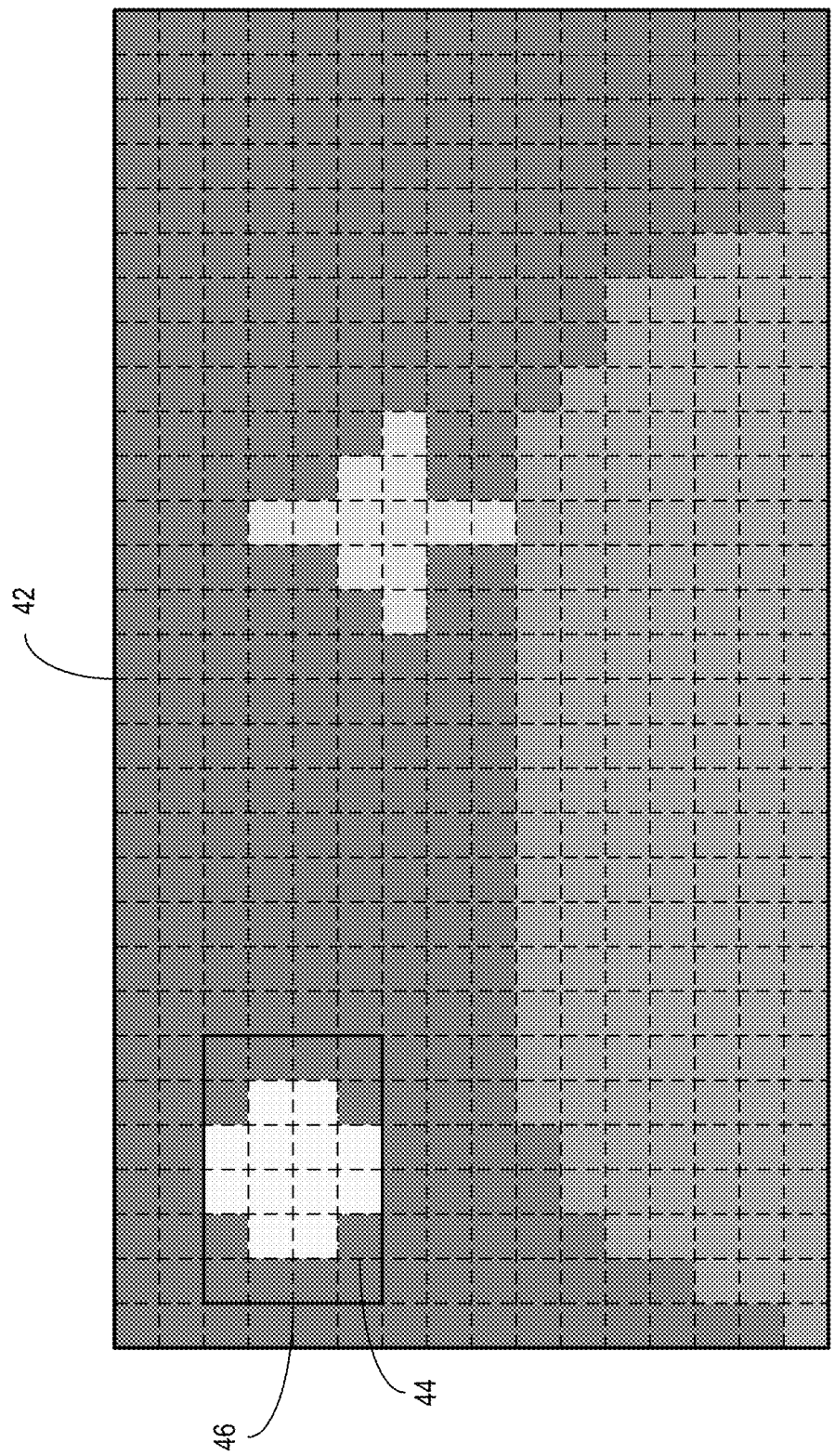
FIG. 2 shows an example frame of a video, according to the embodiment of FIG. 1.

The processor 14 may be configured to receive a video 40. In some embodiments, the video 40 is stored as a video file in the memory 12. Alternatively, the video 40 may be streamed via the one or more communication devices 16 and processed as it is received at the computing device 10. The video 40 may include a plurality of frames 42, each frame 42 including a plurality of pixels 44. The processor 14 may be configured to perform brightness adjustment on each frame 42 of a plurality of frames 42 included in the video 40. In some embodiments, the processor 14 may perform brightness adjustment on the entire video 40, whereas in other embodiments, the processor 14 may perform brightness adjustment on only a subset of the frames 42 included in the video 40. In addition, for each frame 42, the processor 14 may perform brightness adjustment on the entire frame 42. Alternatively, the processor 14 may perform brightness adjustment only on a region of interest of the frame 42 in some embodiments. FIG. 2 shows an example frame 42 including a plurality of pixels 44. The frame 42 shown in FIG. 2 includes a region of interest 46 including a plurality of pixels 44. In the example of FIG. 2, the plurality of pixels 44 includes pixels 44 of different brightness, illustrated in greyscale. Although the region of interest 46 is rectangular in the embodiment of FIG. 2, the region of interest 46 may have other shapes in other embodiments. In some embodiments, the region of interest 46 may be the entire frame 42.

Figure 3:
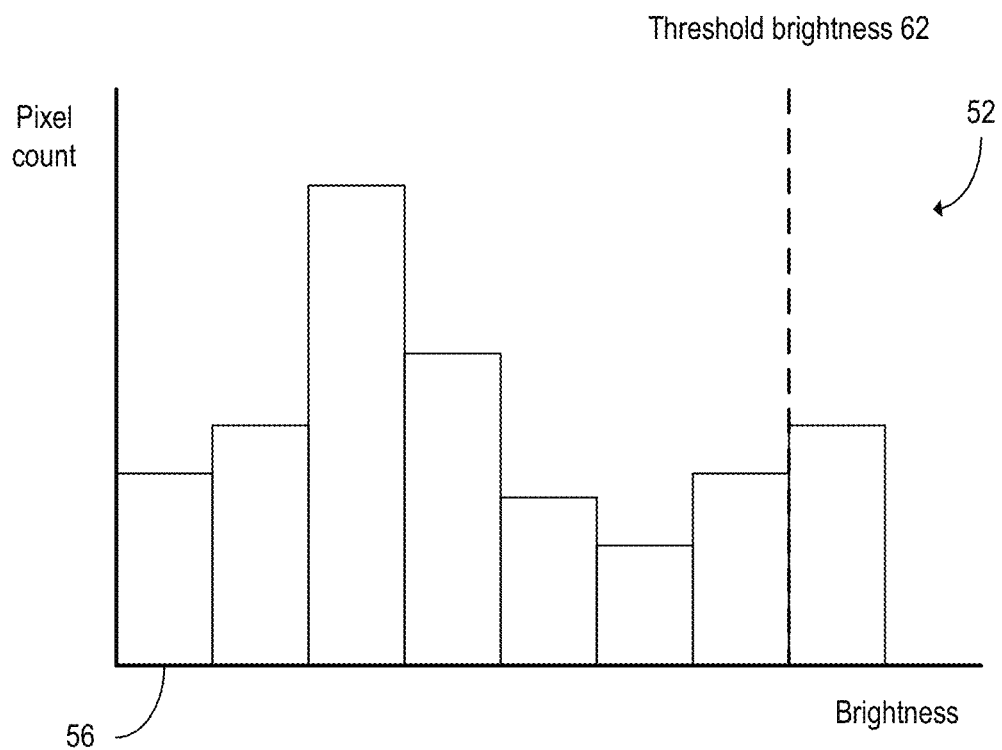
FIG. 3 shows an example brightness characterization, according to the embodiment of FIG. 1.

Each pixel 44 of the plurality of pixels 44 included in the frame 42 may have a respective brightness 54. The processor 14 may be further configured to extract brightness data 50 from the frame 42 related to the brightness 54 of the pixels 44 included in the region of interest 46. In some embodiments, the processor 14 may be configured to determine a brightness characterization 52 for at least the region of interest 46 of the frame 42. FIG. 3 shows an example brightness characterization 52 for a region of interest 46. The brightness characterization 52 may be a brightness distribution including a plurality of brightness ranges 56. The distribution may be in the form of a histogram, as shown. For each brightness range 56 of the plurality of brightness ranges 56, the brightness characterization 52 may indicate a number of pixels 44 in the region of interest 46 having brightness 54 within that brightness range 56. In some embodiments, the brightness characterization 52 may include a brightness range 56 for each brightness 54 the pixels 44 are capable of having. In other embodiments, the processor 14 may bin the pixels 44 into a smaller number of brightness ranges 56. The brightness ranges 56 may be linearly distributed. For example, as shown in FIG. 3, each brightness range 56 may include an eighth of the range between a minimum brightness and a maximum brightness. Non-linear distributions may also be utilized if desired.

Returning to FIG. 1, the processor 14 may be further configured to determine one or more additional brightness characterizations 52 for at least the region of interest 46 of one or more additional frames of the plurality of frames 42. In some embodiments, the one or more additional frames may be one or more following frames 42F that immediately follow the frame 42 in the video 40. For example, the one or more additional frames may be two following frames 42F. In other embodiments, the one or more additional frames may include one or more preceding frames 42P that immediately precede the frame 42.

Based on the brightness data 50, the processor 14 may be further configured to detect a high brightness condition in the region of interest of the frame 42. As one example, the high brightness condition 60 may be a condition in which each of a plurality of pixels 44 in the region of interest 46 exceeding a predetermined threshold number of pixels 66 has a respective brightness 54 exceeding a threshold brightness 62. The threshold brightness 62 may, for example, be adjustable via user input received from the one or more input devices 22. Additionally or alternatively, the predetermined threshold number of pixels 66 may be adjustable via user input in some embodiments.

In other embodiments, the high brightness condition 60 may be a condition in which an average brightness of the region of interest 46 exceeds a predetermined average brightness threshold 68. The average brightness of the region of interest 46 may be a mean brightness or a median brightness. Similarly to the threshold brightness 62 and the predetermined threshold number of pixels 66, the predetermined average brightness threshold 68 may be adjustable via user input in some embodiments.

In some embodiments in which a threshold brightness 62 is used when the processor 14 detects the high brightness condition 60, the processor 14 may determine the threshold brightness 62 based at least in part on the one or more additional brightness characterizations. The one or more additional brightness characterizations may include one or more preceding brightness characterizations 52P and/or one or more following brightness characterizations 52F. In some embodiments, the threshold brightness 62 may differ between frames 42. In order to prevent the appearance of flickering in the video 40 due to rapid changes in brightness, the processor 14 may set the threshold brightness 62 such that the threshold brightness 62 differs by less than a threshold amount from the highest brightness 54 in the one or more additional brightness characterizations 52.

The processor 14 may be further configured to generate a filter 58 for the frame 42. The filter 58 may indicate a change in brightness for each pixel 44 in the region of interest 46. For one or more pixels 44 in the region of interest 46, the change in brightness may be zero. In some embodiments, the change in brightness may be nonuniform over the region of interest 46. Thus, rather than uniformly darkening each pixel 44 in the region of interest 46 by the same amount, the processor 14 may apply different changes in brightness to different pixels 44. For example, the filter 58 may multiply the respective brightness 54 of each pixel 44 in the region of interest 46 by a sigmoid curve. Example code implementing a sigmoid curve to modify brightness is provided below:

```
float sigmoid(float x, float maxBrightness)
{
    float rate = log(255.f*exp(5.5f)* maxBrightness -
        exp(5.5f)) / maxBrightness;
    float offset = log(maxBrightness / (1 - maxBrightness));
    return (maxBrightness * exp((rate * x) - offset)) / (1 +
        exp((rate * x) - offset));
}
```

The processor 14 may be further configured to generate the filter 58 based at least in part on a predetermined brightness change threshold 64. In embodiments in which the high brightness condition 60 is a condition in which an average brightness of the region of interest 46 exceeds a predetermined average brightness threshold 68, the predetermined brightness change threshold 64 may be a threshold amount of change in the average brightness of the region of interest 46. In embodiments in which the high brightness condition 60 is a condition in which each of a plurality of pixels 44 in the region of interest 46 exceeding a predetermined threshold number of pixels 66 has a respective brightness 54 exceeding a threshold brightness 62, the predetermined brightness change threshold 64 may be a threshold difference between the brightness 54 of a pixel 44 in the frame 42 and the brightness 54 of the pixel 44 in the preceding frame 42P. In such embodiments, when a number of pixels 44 greater than the predetermined threshold number of pixels 66 changes in brightness 54 by an amount exceeding the predetermined brightness change threshold 64, the processor 14 may detect the high brightness condition 60. In such embodiments, the threshold brightness 62 may be dynamically adjusted to avoid exceeding the predetermined brightness change threshold 64, as discussed below.

Figure 4:
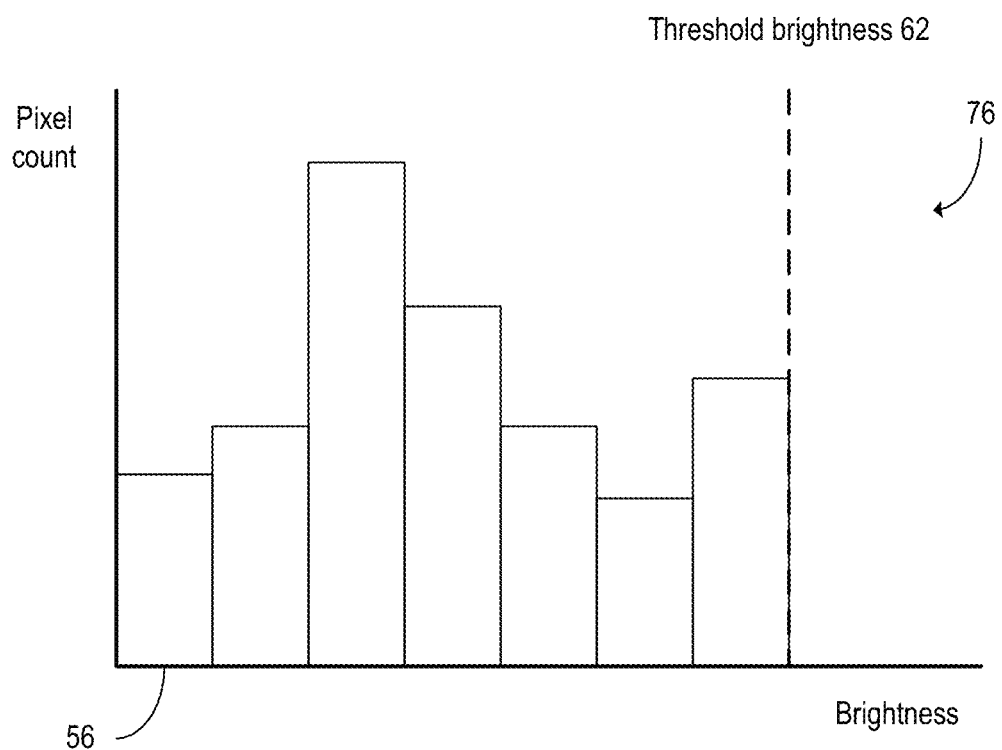
FIG. 4 shows an example filtered brightness characterization, according to the embodiment of FIG. 1.

After generating the filter 58, the processor 14 may be further configured to apply the filter 58 to at least the region of interest 46 of the frame 42 to generate a filtered frame 72, which may be included in a filtered video 70. FIG. 4 shows a filtered brightness characterization 76 for the region of interest 46 of the filtered frame 72. The high brightness condition 60 may not be present in the region of interest 46 of the filtered frame 72. In some embodiments, the number of filtered pixels 74 with respective filtered brightness above the threshold brightness 62 may be below the predetermined threshold number of pixels 66. For example, for a number of filtered pixels 74 in the region of interest 46 of the filtered frame 72 less than the predetermined threshold number of pixels 66, a respective filtered brightness may differ by an amount greater than the predetermined brightness change threshold 64 from the brightness 54 of that pixel 44 in the preceding frame 42P and/or the following frame 42F. In other embodiments, the average brightness of the region of interest 46 of the filtered frame 72 may be below the predetermined average brightness threshold 68. Thus, the rate at which the brightness of the region of interest 46 changes as the video 40 plays may be reduced so as to give the user's eyes more time to adjust to the change in brightness.

Figure 5:
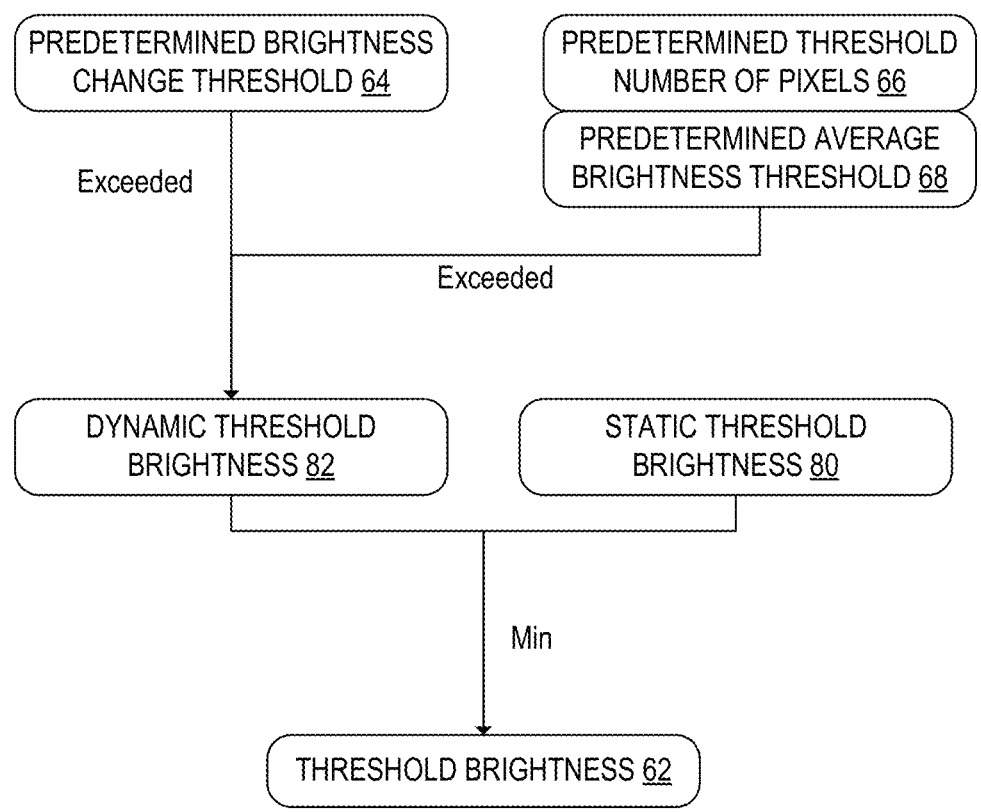
FIG. 5 shows an example determination of a predetermined brightness threshold, according to the embodiment of FIG. 1.

In some embodiments, the processor 14 may be further configured to determine the threshold brightness 62 based at least in part on the predetermined brightness change threshold 64. In such embodiments, when a number of pixels 44 in the region of interest 46 exceeding the predetermined threshold number of pixels 66 would exceed the predetermined brightness change threshold 64 relative to the preceding frame 42P, the filter 58 may restrict the increase in the respective brightness of the pixels 44 to an amount less than or equal to the predetermined brightness change threshold 64. As shown in FIG. 5, the threshold brightness 62 may be expressed as the lower of a static threshold brightness 80 and a dynamic threshold brightness 82. The static threshold brightness 80 may be set by the user via user input or may be a default value. The dynamic threshold brightness 82 may be the threshold used when the predetermined brightness change threshold 64 would be exceeded. Thus, the predetermined brightness change threshold 64 may be dynamically adjusted such that the brightness 54 of the region of interest 46 does not change more quickly than would be comfortable for the user.

In some embodiments, rather than determining that the number of pixels 44 in the region of interest 46 exceeding a predetermined threshold number of pixels 66 would exceed the predetermined brightness change threshold 64, the processor 14 may instead determine that the average brightness of the region of interest 46 would change by an amount greater than the predetermined brightness change threshold 64 relative to the preceding frame 42P. In such embodiments, the filter 58 may restrict the increase in the average brightness of the region of interest 46 to an amount less than or equal to the predetermined brightness change threshold 64.

In embodiments in which the preceding frame 42P and/or the following frame 42F is also filtered, the processor 14 may determine the change in brightness of the region of interest 46 by comparing the brightness characterization 52 of the frame 42 to a filtered brightness characterization 76 of the preceding frame 42P and/or the following frame 42F. For example, the processor 14 may determine whether the change in brightness between the filtered preceding frame 72P and the frame 42 exceeds the predetermined brightness change threshold 68 and/or whether the change in brightness between the frame 42 and the filtered following frame 72F exceeds the predetermined brightness change threshold 68. The processor may be further configured to modify the filter 58 to prevent a change in brightness exceeding the predetermined brightness change threshold 64. The change in brightness 54 may be a change in the brightness 54 of a number of pixels 44 exceeding the predetermined threshold number of pixels 66, or alternatively a change in average brightness of the region of interest 46. In some embodiments, the filter 58 and one or more additional filters applied to the one or more additional frames may be modified iteratively. Thus, changes in filtering between frames may be smoothed and flickering due to rapid changes in filtering may be avoided.

In some embodiments, the filter 58 may be an infinite impulse response filter. Example code implementing the filter 58 as an infinite impulse response filter is provided below:

p - previous avg
mp - previous max
c - current avg
mc - current max
duration - video frame duration
maxLumChange - change rate (based on dilation response)

-continued

```
delta = abs(p−c)
pc = p <= 0.f ? delta / THRESHOLD : delta / p
float x = 0.f;
    float y = 1.f;
    if (duration > 0.f && delta > 0.f)
    {
        float durationScale = duration / (100.f / 3.f);
        float deviation = exp(1.4f * abs(min(mc,mp) − c))
− 1.f;
        float dampen = min(1.f, exp( (1.f / .2f) * (delta
+ MIN_UNORM_VALUE)) − 1.f);
        float pointLightScale = deviation / dampen;
        y = (maxLumChange * durationScale *
pointLightScale);
        y = clamp(y, 0.f, 1.f);
        x = 1.f − y;
    }
// Infinite Impulse Response (IIR) filter.
float a0 = 1.f − x;
float b1 = x;
desired = (a0 * c) + (b1 * p);
if (desired > c || c < 0.1)
{
    desired = c;
}
```

In this example code, p is the average brightness of the preceding frame, mp is the maximum brightness of the preceding frame, c is the average brightness of the current frame 42, mc is the maximum brightness of the current frame 42, duration is the duration of a frame 42, maxLumChange is the predetermined brightness change threshold 64, and x and y are coefficients of the infinite impulse response filter.

In other embodiments, the filter 58 may be a finite impulse response filter. A finite impulse response filter may be used, for example, when the video 40 is a video file stored in the memory 12 of the computing device 10 rather than a streamed video. In embodiments in which the filter 58 is a finite impulse response filter, the one or more additional frames may include a plurality of preceding frames 42P and a plurality of following frames 42F.

After the filtered frame 72 is generated, the processor 14 may be further configured to output the filtered frame 72 for display at the display 34 of the computing device 10. The filtered frame 72 may be output as part of a filtered video 70.

Figure 6:
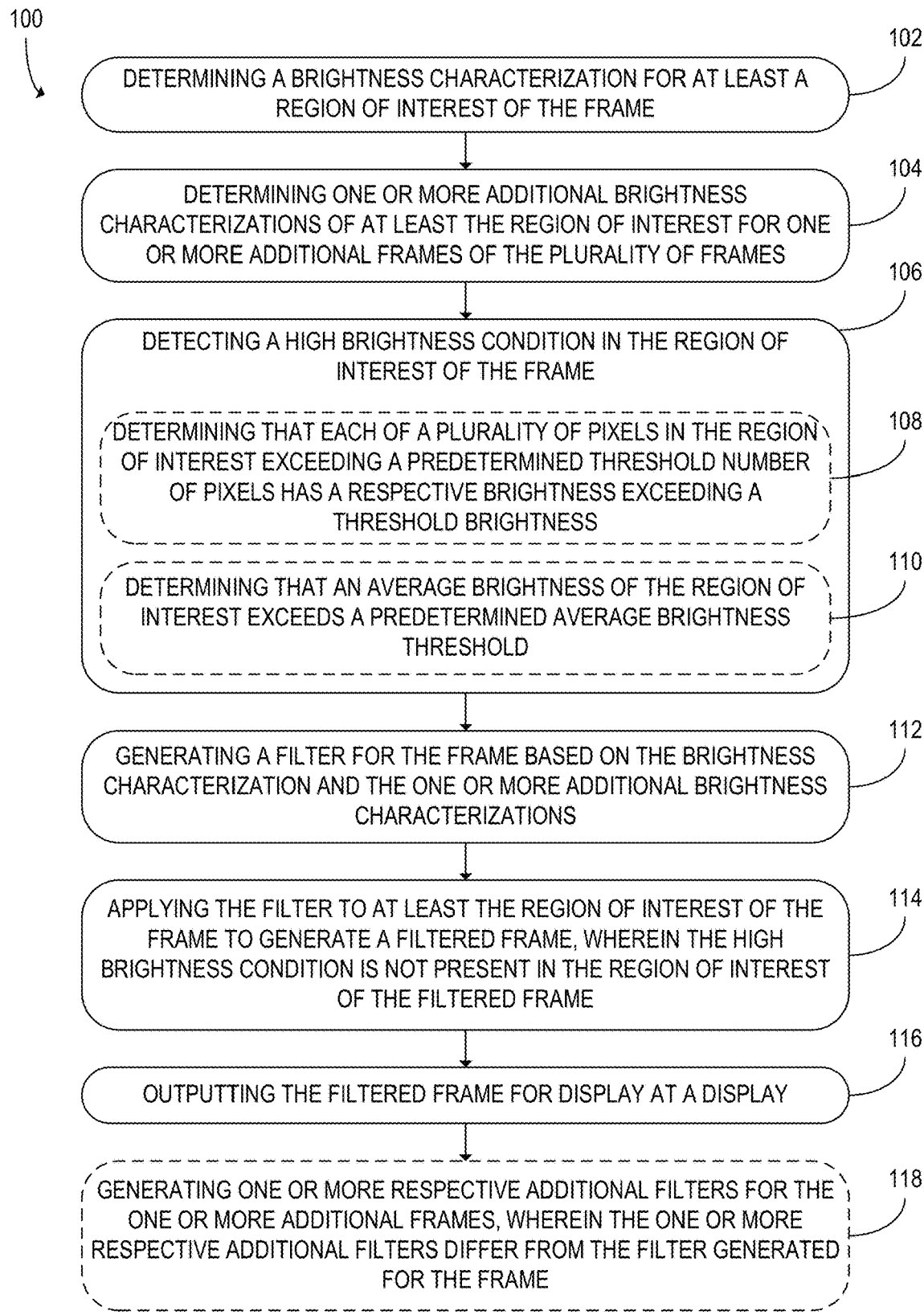
FIG. 6 shows a flowchart of a method for use with a computing device, according to the embodiment of FIG. 1.

FIG. 6 shows a flowchart of a method 100 for use with a computing device. The method 100 may be used with the computing device 10 of FIG. 1, or alternatively with some other computing device. The steps of the method 100 may be performed for each frame of a plurality of frames included in a video. The plurality of frames may include the entire video or alternatively only a subset of the frames of the video.

At step 102, the method 100 may include determining a brightness characterization of at least a region of interest of the frame. The region of interest may include the entire frame or alternatively only a subset of the frame. In some embodiments, the brightness characterization of at least the region of interest of the frame may be a brightness distribution including, for each of a plurality of brightness ranges, a number of pixels in the region of interest having brightness within that brightness range. In such embodiments, the brightness characterization may include a brightness range for each possible brightness a pixel may have. Alternatively, pixels of similar brightness may be binned into a brightness range. In other embodiments, the brightness characterization may be an average brightness, which may be a mean brightness or a median brightness, over the region of interest. At step 104, the method 100 may further include determining one or more additional brightness characterizations of at least the region of interest of one or more additional frames of the plurality of frames. For example, the one or more additional frames may include one or more preceding frames immediately preceding the frame in the video and/or one or more following frames immediately following the frame in the video.

At step 106, the method 100 may further include detecting a high brightness condition in the region of interest of the frame. Detecting the high brightness condition may include, at step 108, determining that each of a plurality of pixels in the region of interest exceeding a predetermined threshold number of pixels has a respective brightness exceeding a threshold brightness. Additionally or alternatively, at step 110, detecting the high brightness condition may include determining that an average brightness of the region of interest exceeds a predetermined average brightness threshold. The threshold brightness may, in some embodiments, be adjustable via user input.

In some embodiments, detecting the high brightness condition may be based at least in part on a predetermined brightness change threshold. The predetermined threshold brightness may be a threshold change in brightness between the frame and the preceding frame. The change in brightness may be a change in the average brightness or a change in brightness of a number of pixels exceeding the predetermined threshold number of pixels. In one example, the predetermined brightness change threshold may be used to determine a dynamic threshold brightness. For example, the dynamic threshold brightness may be a sum of the predetermined brightness change threshold and the average brightness of the region of interest. The threshold brightness may be a lower of a static threshold brightness and a dynamic threshold brightness.

At step 112, the method 100 may further include generating a filter for the frame based on the brightness characterization and the one or more additional brightness characterizations. The filter may be an infinite impulse response filter. Alternatively, the filter may be a finite impulse response filter. At step 114, the method 100 may further include applying the filter to at least the region of interest of the frame to generate a filtered frame. The high brightness condition may not be present in the region of interest of the filtered frame. For example, the region of interest of the filtered frame may include a number of pixels lower than the predetermined threshold number of pixels that exceed the brightness threshold. In other embodiments, the average brightness of the region of interest may below the average brightness threshold. In some embodiments, the filter may be nonuniform over the region of interest rather than modifying the brightness of each pixel in the region of interest by the same amount.

As discussed above, the filter may be generated based on a predetermined brightness change threshold in addition to, or alternatively to, the threshold brightness. In such embodiments, for a number of filtered pixels in the region of interest of the filtered frame less than the predetermined threshold number of pixels, a respective filtered brightness may differ by an amount greater than the predetermined brightness change threshold from the brightness of that pixel in a preceding frame and/or a following frame.

At step 116, the method 100 may further include outputting the filtered frame for display at a display. The display may be included in the computing device at which the method 100 is performed or may be communicatively coupled with the computing device via one or more communication devices.

At step 118, the method 100 may optionally include generating one or more respective additional filters for the one or more additional frames. In embodiments in which step 118 is performed, the one or more respective additional filters may be generated in one or more other iterations of the above steps. The one or more respective additional filters may differ from the filter generated for the frame. Thus, the amount of filtering applied to the region of interest may vary over the plurality of frames for which filtering is performed.

Using the systems and methods discussed above, the brightness of one or more frames of a video may be adjusted such that the video may be viewed comfortably by users whose eyes are highly light-sensitive. This may be done without darkening the one or more frames so heavily that the video would not be enjoyed by users whose eyes are not highly light-sensitive. The above systems and methods for filtering videos may be used both with stored videos and with streamed videos, and may allow the brightness of videos to be adjusted without large buffering delays.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
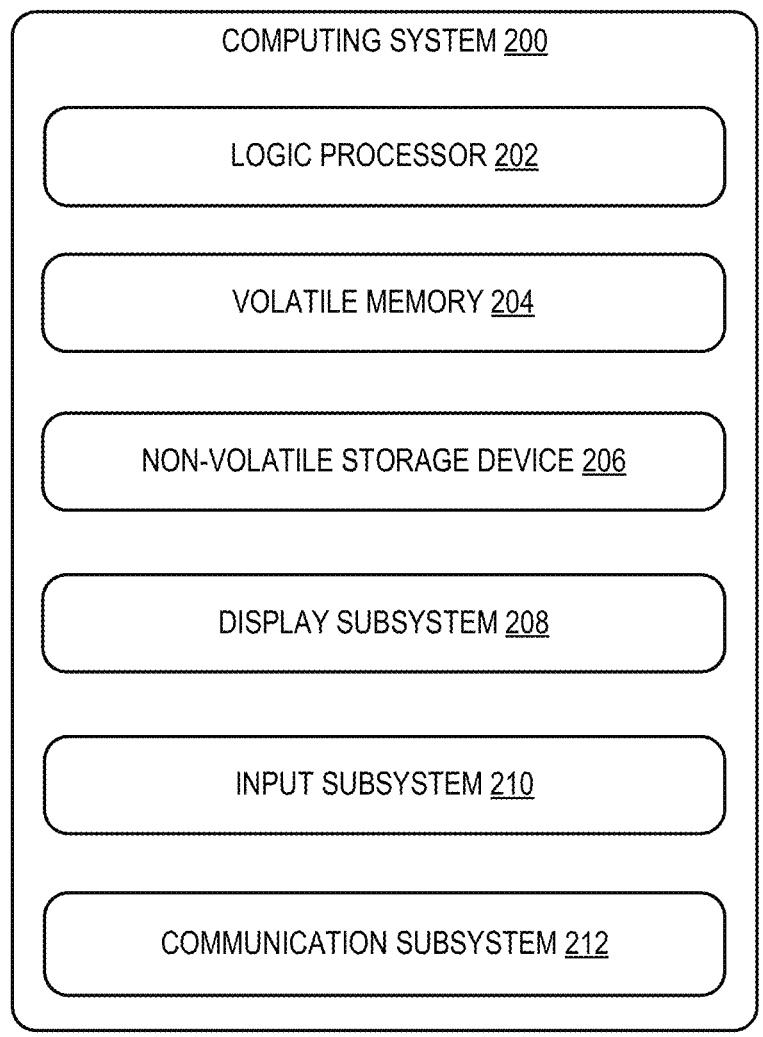
FIG. 7 shows a schematic view of an example computing environment in which the computer device of FIG. 1 may be enacted.

FIG. 7 schematically shows a non-limiting embodiment of a computing system 200 that can enact one or more of the methods and processes described above. Computing system 200 is shown in simplified form. Computing system 200 may embody the computing device 10 described above and illustrated in FIG. 1. Computing system 200 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 200 includes a logic processor 202 volatile memory 204, and a non-volatile storage device 206. Computing system 200 may optionally include a display subsystem 208, input subsystem 210, communication subsystem 212, and/or other components not shown in FIG. 7.

Logic processor 202 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 202 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 206 includes one or more physical devices configured to hold instructions executable by the logic processors to implement the methods and processes described herein. When such methods and processes are implemented, the state of non-volatile storage device 206 may be transformed—e.g., to hold different data.

Non-volatile storage device 206 may include physical devices that are removable and/or built-in. Non-volatile storage device 206 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 206 may include nonvolatile, dynamic, static, read/write, read-only, sequential-access, location-addressable, file-addressable, and/or content-addressable devices. It will be appreciated that non-volatile storage device 206 is configured to hold instructions even when power is cut to the non-volatile storage device 206.

Volatile memory 204 may include physical devices that include random access memory. Volatile memory 204 is typically utilized by logic processor 202 to temporarily store information during processing of software instructions. It will be appreciated that volatile memory 204 typically does not continue to store instructions when power is cut to the volatile memory 204.

Aspects of logic processor 202, volatile memory 204, and non-volatile storage device 206 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 200 typically implemented in software by a processor to perform a particular function using portions of volatile memory, which function involves transformative processing that specially configures the processor to perform the function. Thus, a module, program, or engine may be instantiated via logic processor 202 executing instructions held by non-volatile storage device 206, using portions of volatile memory 204. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 208 may be used to present a visual representation of data held by non-volatile storage device 206. The visual representation may take the form of a graphical user interface (GUI). As the herein described methods and processes change the data held by the non-volatile storage device, and thus transform the state of the non-volatile storage device, the state of display subsystem 208 may likewise be transformed to visually represent changes in the underlying data. Display subsystem 208 may include one or more display devices utilizing virtually any type of technology. Such display devices may be combined with logic processor 202, volatile memory 204, and/or non-volatile storage device 206 in a shared enclosure, or such display devices may be peripheral display devices.

When included, input subsystem 210 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 212 may be configured to communicatively couple various computing devices described herein with each other, and with other devices. Communication subsystem 212 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 200 to send and/or receive messages to and/or from other devices via a network such as the Internet.

According to one aspect of the present disclosure, a computing device is provided, including a display and a processor. The processor may be configured to, for each frame of a plurality of frames included in a video, determine a brightness characterization for at least a region of interest of the frame. The processor may be further configured to determine one or more additional brightness characterizations for at least the region of interest of one or more additional frames of the plurality of frames. The processor may be further configured to detect a high brightness condition in the region of interest of the frame. The processor may be further configured to generate a filter for the frame based on the brightness characterization and the one or more additional brightness characterizations. The processor may be further configured to apply the filter to at least the region of interest of the frame to generate a filtered frame. The high brightness condition may not be present in the region of interest of the filtered frame. The processor may be further configured to output the filtered frame for display at the display.

According to this aspect, the filter may be an infinite impulse response filter. According to this aspect, the one or more additional frames may immediately follow the frame in the video.

According to this aspect, the filter may be a finite impulse response filter.

According to this aspect, the brightness characterization for at least the region of interest of the frame may be a brightness distribution including, for each of a plurality of brightness ranges, a number of pixels in the region of interest having brightness within that brightness range.

According to this aspect, the high brightness condition may be a condition in which each of a plurality of pixels in the region of interest exceeding a predetermined threshold number of pixels has a respective brightness exceeding a threshold brightness. According to this aspect, the threshold brightness is a lower of a static threshold brightness and a dynamic threshold brightness.

According to this aspect, the high brightness condition may be a condition in which an average brightness of the region of interest exceeds a predetermined average brightness threshold.

According to this aspect, the processor may be configured to detect the high brightness condition based at least in part on a predetermined brightness change threshold. According to this aspect, for a number of filtered pixels in the region of interest of the filtered frame less than the predetermined threshold number of pixels, a respective filtered brightness may differ by an amount greater than the predetermined brightness change threshold from the brightness of that pixel in a preceding frame and/or a following frame.

According to this aspect, the processor may be further configured to generate one or more respective additional filters for the one or more additional frames. The one or more respective additional filters may differ from the filter generated for the frame.

According to this aspect, a change in brightness between the frame and the filtered frame may be nonuniform over at least the region of interest.

According to another aspect of the present disclosure, a method for use with a computing device is provided. The method may include, for each frame of a plurality of frames included in a video, determining a brightness characterization for at least a region of interest of the frame. The method may further include determining one or more additional brightness characterizations of at least the region of interest for one or more additional frames of the plurality of frames. The method may further include detecting a high brightness condition in the region of interest of the frame. The method may further include generating a filter for the frame based on the brightness characterization and the one or more additional brightness characterizations. The method may further include applying the filter to at least the region of interest of the frame to generate a filtered frame. The high brightness condition may not be present in the region of interest of the filtered frame. The method may further include outputting the filtered frame for display at a display.

According to this aspect, the filter may be an infinite impulse response filter.

According to this aspect, the filter may be a finite impulse response filter.

According to this aspect, the brightness characterization for at least the region of interest of the frame may be a brightness distribution including, for each of a plurality of brightness ranges, a number of pixels in the region of interest having brightness within that brightness range.

According to this aspect, detecting the high brightness condition may include determining that each of a plurality of pixels in the region of interest exceeding a predetermined threshold number of pixels has a respective brightness exceeding a threshold brightness.

According to this aspect, detecting the high brightness condition may include determining that an average brightness of the region of interest exceeds a predetermined average brightness threshold.

According to this aspect, detecting the high brightness condition may be based at least in part on a predetermined brightness change threshold.

According to another aspect of the present disclosure, a computing device is provided, including a display and a processor. The processor may be configured to, for each frame of a plurality of frames included in a video, determine a brightness characterization for at least a region of interest of the frame. The processor may be further configured to determine an additional brightness characterization for at least the region of interest for at least a preceding frame of the plurality of frames. The processor may be further configured to determine that a high brightness condition is present in the region of interest of the frame. The high brightness condition may include an increase in an average brightness of the region of interest relative to a preceding brightness of the region of interest in the preceding frame exceeding a predetermined brightness change threshold. The processor may be further configured to generate a filter for the frame based on the brightness characterization and the one or more additional brightness characterizations. The processor may be further configured to apply the filter to at least the region of interest of the frame to generate a filtered frame. The high brightness condition may not be present in the region of interest of the filtered frame. The processor may be further configured to output the filtered frame for display at the display.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device comprising:
   a display; and
   a processor configured to:
      for each frame of a plurality of frames included in a video:
         determine a brightness characterization for at least a region of interest of a current frame;
         determine one or more additional brightness characterizations for at least the region of interest of one or more additional frames of the plurality of frames that precede or follow the current frame in the video;
         detect a high brightness condition in the region of interest of the frame;
         generate a filter for the current frame based on the brightness characterization and the one or more additional brightness characterizations;
         apply the filter to at least the region of interest of the current frame to generate a filtered frame, wherein the high brightness condition is not present in the region of interest of the filtered frame; and
         output the filtered frame for display at the display.

2. The computing device of claim 1, wherein the filter is an infinite impulse response filter.

3. The computing device of claim 2, wherein the one or more additional frames immediately follow the current frame in the video.

4. The computing device of claim 1, wherein the filter is a finite impulse response filter.

5. The computing device of claim 1, wherein the brightness characterization for at least the region of interest of the current frame is a brightness distribution including, for each of a plurality of brightness ranges, a number of pixels in the region of interest having brightness within that brightness range.

6. The computing device of claim 1, wherein the high brightness condition is a condition in which each of a plurality of pixels in the region of interest exceeding a predetermined threshold number of pixels has a respective brightness exceeding a threshold brightness.

7. The computing device of claim 6, wherein the threshold brightness is a lower of a static threshold brightness and a dynamic threshold brightness.

8. The computing device of claim 1, wherein the high brightness condition is a condition in which an average brightness of the region of interest exceeds a predetermined average brightness threshold.

9. The computing device of claim 1, wherein the processor is configured to detect the high brightness condition based at least in part on a predetermined brightness change threshold.

10. The computing device of claim 9, wherein, for a number of filtered pixels in the region of interest of the filtered frame less than the predetermined threshold number of pixels, a respective filtered brightness differs by an amount greater than the predetermined brightness change threshold from the brightness of that pixel in a preceding frame and/or a following frame of the one or more additional frames.

11. The computing device of claim 1, wherein:
the processor is further configured to generate one or more respective additional filters for the one or more additional frames; and
the one or more respective additional filters differ from the filter generated for the current frame.

12. The computing device of claim 1, wherein a change in brightness between the current frame and the filtered frame is nonuniform over at least the region of interest.

13. The computing device of claim 1, wherein the plurality of frames includes an entirety of the video.

14. The computing device of claim 1, wherein the plurality of frames includes only a subset of frames of the video.

15. A method for use with a computing device, the method comprising:
for each frame of a plurality of frames included in a video:
determining a brightness characterization for at least a region of interest of a current frame;
determining one or more additional brightness characterizations of at least the region of interest for one or more additional frames of the plurality of frames that precede or follow the current frame in the video;
detecting a high brightness condition in the region of interest of the current frame;
generating a filter for the current frame based on the brightness characterization and the one or more additional brightness characterizations;
applying the filter to at least the region of interest of the current frame to generate a filtered frame, wherein the high brightness condition is not present in the region of interest of the filtered frame; and
outputting the filtered frame for display at a display.

16. The method of claim 15, wherein the filter is an infinite impulse response filter.

17. The method of claim 15, wherein the filter is a finite impulse response filter.

18. The method of claim 15, wherein the brightness characterization for at least the region of interest of the current frame is a brightness distribution including, for each of a plurality of brightness ranges, a number of pixels in the region of interest having brightness within that brightness range.

19. The method of claim 15, wherein detecting the high brightness condition includes determining that each of a plurality of pixels in the region of interest exceeding a predetermined threshold number of pixels has a respective brightness exceeding a threshold brightness.

20. The method of claim 15, wherein detecting the high brightness condition includes determining that an average brightness of the region of interest exceeds a predetermined average brightness threshold.

21. The method of claim 15, wherein detecting the high brightness condition is based at least in part on a predetermined brightness change threshold.

22. A computing device comprising:
a display; and
a processor configured to:
for each frame of a plurality of frames included in a video:
determine a brightness characterization for at least a region of interest of a current frame;
determine an additional brightness characterization for at least the region of interest for at least a preceding frame of the plurality of frames;
determine that a high brightness condition is present in the region of interest of the current frame, wherein the high brightness condition includes an increase in an average brightness of the region of interest relative to a preceding brightness of the region of interest in the preceding frame exceeding a predetermined brightness change threshold;
generate a filter for the current frame based on the brightness characterization and the one or more additional brightness characterizations;
apply the filter to at least the region of interest of the current frame to generate a filtered frame, wherein the high brightness condition is not present in the region of interest of the filtered frame; and
output the filtered frame for display at the display.

* * * * *